United States Patent
Yang et al.

(10) Patent No.: US 11,300,966 B2
(45) Date of Patent: Apr. 12, 2022

(54) VEHICLE CONTROL METHOD AND APPARATUS, DEVICE, VEHICLE AND STORAGE MEDIUM

(71) Applicant: BEIJING BAIDU NETCOM SCIENCE TECHNOLOGY CO., LTD., Beijing (CN)

(72) Inventors: Fan Yang, Beijing (CN); Xiaoxing Zhu, Beijing (CN); Xiang Liu, Beijing (CN); Shuang Zhang, Beijing (CN); Jingjing Xue, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 75 days.

(21) Appl. No.: 16/708,514

(22) Filed: Dec. 10, 2019

(65) Prior Publication Data

US 2020/0117203 A1 Apr. 16, 2020

(30) Foreign Application Priority Data

Dec. 10, 2018 (CN) .......................... 201811502468.5

(51) Int. Cl.
*G05D 1/02* (2020.01)
*G08G 1/052* (2006.01)
(Continued)

(52) U.S. Cl.
CPC ....... *G05D 1/0214* (2013.01); *B60W 60/0015* (2020.02); *G05D 1/0088* (2013.01);
(Continued)

(58) Field of Classification Search
CPC .... G05D 1/0214; G05D 1/0088; G08G 1/048; G08G 1/0133; G08G 1/052; G08G 1/09626; B60W 60/0015
See application file for complete search history.

(56) References Cited

U.S. PATENT DOCUMENTS 9,489,841 B1 * 11/2016 Huggins ................ G08G 1/052
9,656,606 B1 * 5/2017 Vose ................... G01C 21/3461
(Continued)

FOREIGN PATENT DOCUMENTS

CN 102361777 A 2/2012
CN 102788986 A 11/2012
(Continued)

OTHER PUBLICATIONS

Office Action dated Dec. 31, 2019 in Corresponding Chinese Application No. 201811502468.5, 14 pages.

*Primary Examiner* — Dale W Hilgendorf
(74) *Attorney, Agent, or Firm* — Dilworth IP, LLC

(57) ABSTRACT

The present disclosure provides a vehicle control method, including: acquiring current driving information of a vehicle; determining, according to the current driving information and a preset risk map, whether the vehicle drives to a risky road segment; and controlling a driving state of the vehicle accordingly when it is determined that the vehicle drives to the risky road segment. By presetting a risk map, defining road and roadside risky areas in the map, defining risky road segments of roads according to the road and roadside risky areas, determining in real time, whether the vehicle drives to a risky road segment, and controlling a driving state of the vehicle when it is determined that the vehicle drives to the risky road segment, so as to avoid risks that the risky areas cause to the driving of the vehicle, the driving safety of the vehicle can be effectively improved.

19 Claims, 4 Drawing Sheets

(51) Int. Cl.
  *G08G 1/0962* (2006.01)
  *G05D 1/00* (2006.01)
  *G08G 1/01* (2006.01)
  *B60W 60/00* (2020.01)
  *G08G 1/048* (2006.01)

(52) U.S. Cl.
  CPC ............ *G08G 1/0133* (2013.01); *G08G 1/048* (2013.01); *G08G 1/052* (2013.01); *G08G 1/09626* (2013.01)

(56) References Cited

U.S. PATENT DOCUMENTS

| | | | |
|---|---|---|---|
| 10,388,157 B1 * | 8/2019 | Hayes | G08G 1/0112 |
| 10,699,347 B1 * | 6/2020 | Slusar | G06Q 40/08 |
| 2012/0035797 A1 * | 2/2012 | Oobayashi | G05D 1/0214 |
| | | | 701/23 |
| 2013/0010112 A1 * | 1/2013 | Goto et al. | G06K 9/00805 |
| | | | 348/148 |
| 2014/0180723 A1 * | 6/2014 | Cote et al. | G07C 5/008 |
| | | | 705/4 |
| 2016/0035222 A1 * | 2/2016 | Mikuni | G08G 1/0137 |
| | | | 701/117 |
| 2016/0171521 A1 * | 6/2016 | Ramirez | G06Q 10/0635 |
| | | | 701/409 |
| 2017/0234689 A1 * | 8/2017 | Gibson | G01C 21/3461 |
| | | | 701/25 |
| 2017/0243485 A1 * | 8/2017 | Rubin | H04W 4/026 |
| 2018/0022327 A1 * | 1/2018 | Kitagawa | B60T 7/12 |
| | | | 180/275 |
| 2018/0061230 A1 * | 3/2018 | Madigan | G08G 1/012 |
| 2018/0239359 A1 * | 8/2018 | Jian | G01C 21/3461 |
| 2018/0276485 A1 * | 9/2018 | Heck | G01C 21/3461 |
| 2018/0299284 A1 * | 10/2018 | Wang | G01C 21/3694 |
| 2019/0333386 A1 * | 10/2019 | Horita | B60W 30/0956 |
| 2020/0039510 A1 * | 2/2020 | Kume | B60R 21/00 |
| 2021/0300419 A1 * | 9/2021 | Matsunaga | B60W 60/0015 |

FOREIGN PATENT DOCUMENTS

| | | | |
|---|---|---|---|
| CN | 104236558 A | 12/2014 | |
| CN | 105460010 A | 4/2016 | |
| CN | 108549880 A | 9/2018 | |
| CN | 108583571 A | 9/2018 | |
| JP | 2017100608 A * | 6/2017 | ............ G08G 1/00 |
| JP | 2017186011 A | 10/2017 | |

* cited by examiner

VEHICLE CONTROL METHOD AND APPARATUS, DEVICE, VEHICLE AND STORAGE MEDIUM

CROSS-REFERENCE TO RELATED APPLICATIONS

This application claims priority to Chinese Patent Application No. 201811502468.5, filed on Dec. 10, 2018, which is hereby incorporated by reference in its entirety.

TECHNICAL FIELD

The present disclosure relates to the field of automatic driving technologies, and in particular, to a vehicle control method and apparatus, a device, a vehicle, and a storage medium.

BACKGROUND

With the rapid development of science and technology, autonomous driving technologies have gradually entered people's sight and become currently hot.

In a process of automatic driving, it is necessary to rely on a map for navigation. In the map, a road usually consists of multiple lanes. A vehicle only needs to pay attention to a situation on the road, and there is no need to care about a roadside situation. However, there may be a lawn, a wood, a school, etc. at a roadside, and people may walk from the roadside to the road at any time, and the vehicle cannot learn this potential danger, which is likely to cause a safety incident.

Therefore, how to achieve autonomous driving more safely becomes a technical problem that urgently needs to be solved.

SUMMARY

The present disclosure provides a vehicle control method, an apparatus, a device, a vehicle, and a storage medium to solve low safety and other defects of automatic driving in the prior art.

A first aspect of the present disclosure provides a vehicle control method, including:

obtaining current driving information of a vehicle;

determining, according to the current driving information and a preset risk map, whether the vehicle drives to a risky road segment, where the preset risk map includes risky road segments of roads; and controlling a driving state of the vehicle accordingly if it is determined that the vehicle drives to the risky road segment.

A second aspect of the present disclosure provides a vehicle control apparatus, including:

an obtaining module, configured to obtain current driving information of a vehicle;

a processing module, configured to determine, according to the current driving information and a preset risk map, whether the vehicle drives to a risky road segment, where the preset risk map includes risky road segments on roads; and a controlling module, configured to control a driving state of the vehicle accordingly if it is determined that the vehicle drives to the risky road segment.

A third aspect of the present disclosure provides a computer device including: at least one processor and a memory; the memory stores a computer program; and the at least one processor executes the computer program stored in the memory to implement the method provided by the first aspect.

A fourth aspect of the present disclosure provides a vehicle including: at least one sensor, and the apparatus as provided by the second aspect.

A fifth aspect of the present disclosure provides a computer readable storage medium, where the computer readable storage medium stores a computer program, which, when executed, implements the method provided by the first aspect.

With the vehicle control method and the apparatus, the device, the vehicle and the storage medium provided by the present disclosure, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved.

BRIEF DESCRIPTION OF DRAWINGS

In order to illustrate the technical solutions in embodiments of the present disclosure or in the prior art more clearly, the drawings required for the description of the embodiments or the prior art will be briefly described below. Obviously, the drawings in the following description illustrate some embodiments of the present disclosure, and other drawings can be obtained according to the drawings without any creative efforts for those skilled in the art.

The specific embodiments of the present disclosure have been illustrated by the above-described drawings, which will be described in more detail hereinafter. The drawings and the textual description are not intended to limit the scope of the present disclosure in any way, but to describe the concepts in the present disclosure for those skilled in the art by referring to the specific embodiments.

DESCRIPTION OF EMBODIMENTS

In order to make objectives, technical solutions and advantages of the embodiments of the present disclosure clearer, the technical solutions of the embodiments of the present disclosure will be described clearly and comprehensively below with reference to the drawings accompanying the embodiments. Apparently, the described embodiments are part rather than all of the embodiments of the present disclosure. All the other embodiments obtained by persons of ordinary skill in the art based on the embodiments of the present disclosure without creative efforts are within the protection scope of the present disclosure.

ROI: region of interest, refers to a region required to be processed which is outlined from a processed image in a form of a box, a circle, an ellipse, an irregular polygon, etc. during the machine vision and image processing, called the region of interest.

The vehicle control method provided by the embodiments of the present disclosure is applicable to an automatic driving control scenario of a vehicle. A risk map is pre-established, which may be independent map data or a risk layer defined in a normal navigation map of the vehicle. For example, an ROI layer is defined in a map to provide relevant semantic information outside the road, to provide more risk reference information for the automatic driving of the vehicle, and to improve the driving safety of the vehicle.

Moreover, the terms "first", "second", and the like are used for the purpose of description only, and cannot be construed as indicating or implying a relative importance or implicitly indicating a quantity of technical features indicated. In the following description of respective embodiments, "a plurality of" or "multiple" means more than two unless specifically defined otherwise.

Following specific embodiments may be combined with each other, and same or similar concepts or processes may not be repeated in some embodiments. Embodiments of the present disclosure will be described below with reference to the accompanying drawings.

Embodiment I

This embodiment provides a vehicle control method for automatic driving control of a vehicle. The executive body of this embodiment is a control apparatus of the vehicle, and the apparatus may be disposed in a computer device, and the computer device may be disposed on the vehicle.

Figure 1:
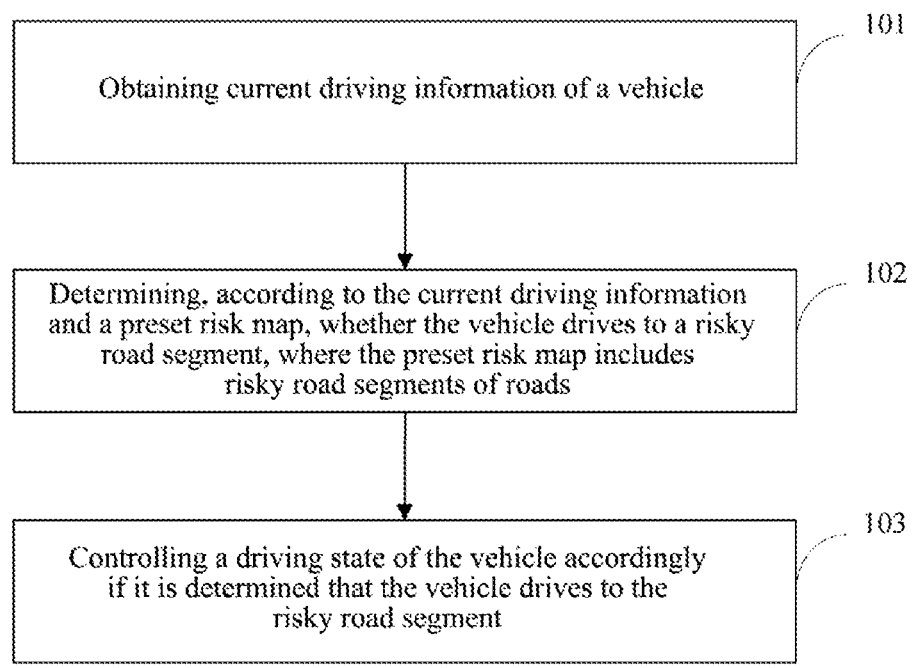
FIG. 1 is a schematic flowchart of a vehicle control method according to an embodiment of the present disclosure.

As shown in FIG. 1 which is a schematic flowchart of a vehicle control method provided by this embodiment, the method includes:

Step 101: obtaining current driving information of a vehicle.

Specifically, the vehicle may be an autonomously driving vehicle or a vehicle having a certain processing capability, such as a semi-automatically driving vehicle. During the driving of the vehicle, the current driving information of the vehicle, such as a current position of the vehicle, a current driving speed, a current acceleration, and the like, may be obtained in real time. Whether the vehicle drives to a risky road segment needs to be determined based on the current driving information of the vehicle.

Step 102: determining, according to the current driving information and a preset risk map, whether the vehicle drives to a risky road segment, where the preset risk map includes risky road segments of roads.

Specifically, the risk map may be preset, and the risk map may be independent map data or a risk layer defined in a normal navigation map of the vehicle. For example, an ROI layer is defined in a map to provide relevant semantic information on or outside a road, to provide more risk reference information for the automatic driving of the vehicle, and to improve the driving safety of the vehicle.

Optionally, the risky road segment may be determined based on risky areas on a road and at a roadside. The road and roadside risky areas are depicted in the preset risk map, and corresponding risky road segments are depicted for respective risky areas.

Illustratively, there is a school, a sidewalk, bushes, a lawn, a wood, etc. at the roadside. For example, for the school, there may be primary school students walking from the school to the road; for the lawn, some people playing on the lawn may kick a ball onto the road and so on. These areas pose certain risks to the road, so these risky areas can be depicted.

Optionally, a risky area may also be a cliff, a water area (a risky area caused by waterside geographic information), a risky area caused by weather such as heavy rain or hail, an accident (such as a car accident or fire) area, a wireless risky (such as weak communication signal, and a dark light) area, and many more. A specific setting of the risky area may be any area in an actual situation that may cause risks to the driving of the vehicle, which is not limited in this embodiment.

Optionally, a risky area may also be, for example, a certain road segment where an accident occurs, a certain road segment under maintenance, a certain road segment with a sharp turn, a certain road segment with a congestion, and the like, which may be set according to an actual situation, and is not limited in this embodiment.

In the defined risk map, different risky road segments can be set according to the risky areas, and during the driving of the vehicle, the vehicle's current driving information is compared with the risk map in real time to determine whether the vehicle drives to a certain risky road segment.

Illustratively, according to a comparison of current location information of the vehicle with coordinates of a risky road segment area in the risk map, if the current location information is in the risky road segment area, or a distance between the current location information and the risky road segment area is less than a preset distance threshold, the vehicle may be considered to drive to the risky road segment, or be about to drive to the risky road segment.

Optionally, for the establishment of the preset risk map, it is possible that when map data is collected for establishing a navigation map, not only road data is collected, but also data outside a road is collected, and the data outside the road is selectively processed, to mark the risky areas such as a school, a lawn, bushes, a sidewalk, etc. It is also possible to classify different roadside risky areas and set different risk levels for different types so that when the vehicle uses the map at a later time, a driving state of the vehicle can be controlled according to different risk levels as the vehicle drives to risky road segments corresponding to different risky areas.

Step 103: controlling a driving state of the vehicle accordingly if it is determined that the vehicle drives to the risky road segment.

Specifically, if it is determined that the vehicle drives to a certain risky road segment, it is necessary to control the driving state of the vehicle accordingly. For example, it is necessary to control the vehicle to decelerate, stop, and so on.

Optionally, the driving state of the vehicle may be controlled according to the risk level (or risk probability) of the risky road segment. For example, the greater the risk level, the lower the driving speed of the vehicle at which the vehicle is controlled to pass the risky road segment or even the vehicle is controlled to stop; for a lower risk level, the vehicle can be controlled to pass the risky road segment at a relatively greater driving speed or even in a normal driving. A specific control level can be set according to actual needs, which is not limited in this embodiment.

Optionally, if it is determined that the vehicle drives to a certain risky road segment, a display screen or a voice broadcast apparatus on the vehicle may be controlled to give warning information to alert passengers in the vehicle.

With the vehicle control method provided in this embodiment, by presetting a risk map, defining road and roadside risky areas in the map, defining risky road segments of roads according to the road and the roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved.

Embodiment II

This embodiment further supplements the method provided in Embodiment I.

Figure 2:
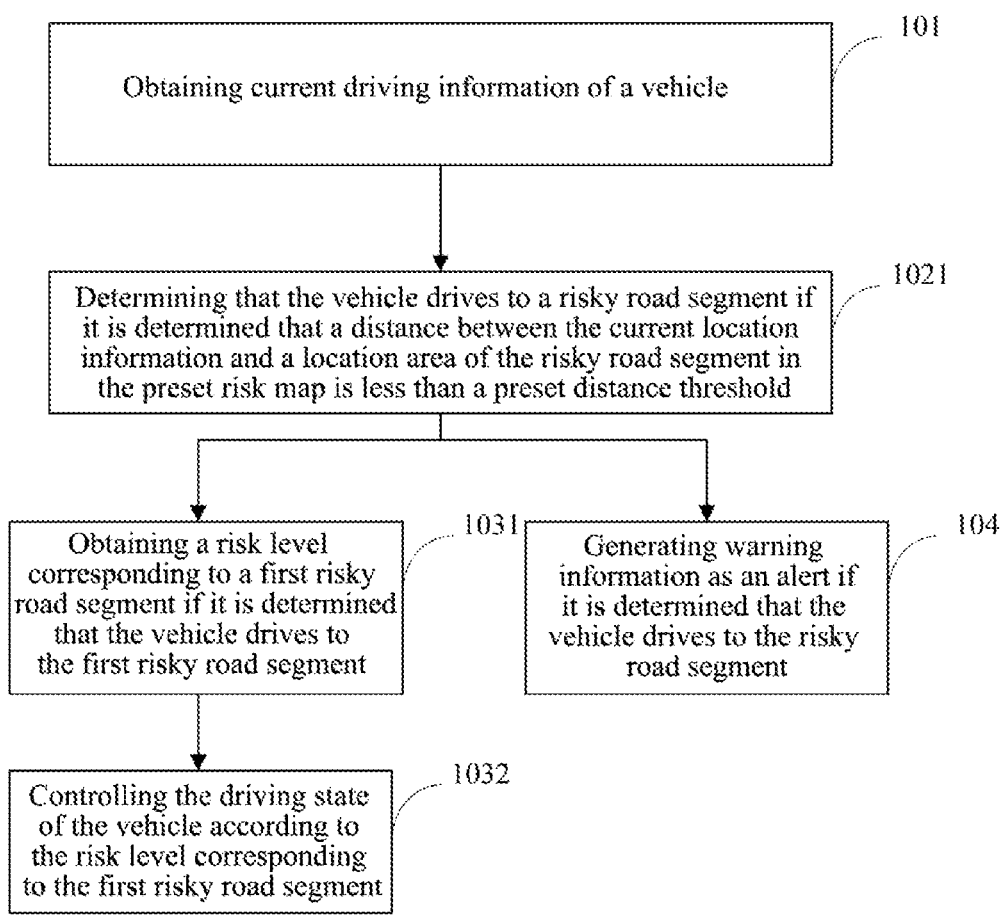
FIG. 2 is a schematic flowchart of a vehicle control method according to another embodiment of the present disclosure.

As shown in FIG. 2, it is a schematic flowchart of a vehicle control method provided by this embodiment.

As an implementation, on the basis of the foregoing Embodiment I, optionally, the current driving information includes current location information, and the Step 102 specifically includes:

Step 1021: determining that the vehicle drives to the risky road segment if it is determined that a distance between the current location information and a location area of the risky road segment in the preset risk map is less than a preset distance threshold.

Specifically, the location information of the risky road segment may be obtained from the preset risk map, which may be all the location information of an entire road segment of each risky road segment, or may be the location information of a boundary of each risky road segment, which may be set according to an actual situation and is not limited in this embodiment. The distance between the current location of the vehicle and the risky road segment in the preset risk map is calculated, and when a distance between the current location of the vehicle and a certain risky road segment is less than the preset distance threshold, it is indicated that the vehicle drives or is about to drive to the risky road segment. It can be understood that the risky road segment of the road ahead of the current location of the vehicle can be obtained according to the driving direction of the vehicle to calculate the distance between the two, and details are not described here again.

The current location information may be GPS location information, or location information positioned by other means, and the like, which is not limited in this embodiment.

The preset distance threshold can be set according to an actual situation, which is not limited in this embodiment. For example, the preset distance threshold can be 200 meters, 100 meters, etc., in order to control the vehicle to decelerate in advance.

As another implementation, on the basis of the foregoing Embodiment I, optionally, the preset risk map further includes risky areas corresponding to the risky road segments, where the risky areas include roadside risky areas and road risky areas;

Step 103 specifically includes:

Step 1031: obtaining a risk level corresponding to a first risky road segment if it is determined that the vehicle drives to the first risky road segment.

Step 1032: controlling the driving state of the vehicle according to the risk level corresponding to the first risky road segment.

Here, a risky area may be a roadside risky area, such as a school, a lawn, a water area, a cliff, etc. at a roadside, or a road risky area, such as road maintenance, a car accident, road congestion, a sharp turn, road damage, and the like.

Specifically, risk levels corresponding to different risky road segments may be set in the preset risk map, and when the vehicle is determined to drive to the first risky road segment, the risk level corresponding to the first risky road segment is obtained, and the driving state of the vehicle is controlled according to the risk level corresponding to the first risky road segment.

Illustratively, the greater the risk level, the lower the driving speed of the vehicle at which the vehicle is controlled to pass the risky road segment or even the vehicle is controlled to stop; for a lower risk level, the vehicle can be controlled to pass the risky road segment at a relatively greater driving speed or even in a normal driving. A specific control level can be set according to actual needs, which is not limited in this embodiment.

Optionally, obtaining the risk level corresponding to the first risky road segment if it is determined that the vehicle drives to the first risky road segment, includes:

obtaining a type of a risky area corresponding to the first risky road segment if it is determined that the vehicle drives to the first risky road segment.

determining the risk level corresponding to the first risky road segment according to the type of the risky area corresponding to the first risky road segment.

Specifically, the risk levels corresponding to the different risky road segments may be determined according to types of roadside risky areas corresponding to the risk road segments.

Illustratively, taking the roadside risky area as an example, if the roadside risky area is a school and there is no guardrail between the school and the road, then the risk level is high; if the roadside risky area is a school but a guardrail is provided between the school and the road, then the risk level is low. If the roadside risky area is a lawn and there is no guardrail and there is someone playing football or playing on the lawn, it is likely that the ball may be kicked onto the road, and then someone may go to the road to pick up the ball, so the risk level is very high, while if there is a high guardrail between the lawn and the road, obviously the risk level is relatively low, and so on. The specific risk level can be set according to an actual situation on the roadside, which will not be repeated here.

Optionally, the current driving information further includes a current driving speed, and different risk levels correspond to different driving speeds;

controlling the driving state of the vehicle according to the risk level corresponding to the first risky road segment includes:

determining whether the current driving speed is greater than a driving speed corresponding to the risk level corresponding to the first risky road segment; and controlling the vehicle to decelerate if it is determined that the current driving speed is greater than the driving speed corresponding to the risk level corresponding to the first risky road segment.

Specifically, driving speeds corresponding to the different risk levels may be set, and it is possible that, according to whether the current driving speed of the vehicle exceeds the driving speed corresponding to the risk level corresponding to the first risky road segment, if the driving speed corresponding to the risk level corresponding to the first risky road segment is exceeded, the vehicle needs to be controlled to decelerate, and if the driving speed corresponding to the risk level corresponding to the first risky road segment is not exceeded, the vehicle can continue driving at the current driving speed. For example, the driving speed corresponding to the risk level corresponding to the first risky road segment is 30 km/h, and the current driving speed is 60 km/h, then it is necessary to control the vehicle to decelerate to below 30 km/h, to pass the first risky road segment slowly.

The driving speed corresponding to a specific risk level can be set according to an actual situation, which is not limited in this embodiment.

Figure 3:
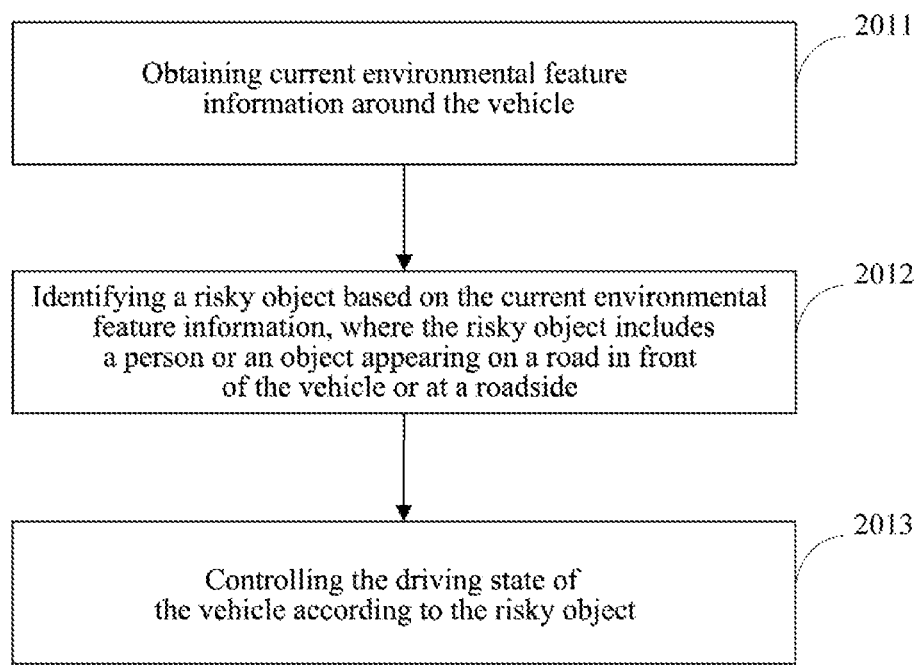
FIG. 3 is a schematic flowchart of another vehicle control method according to another embodiment of the present disclosure.

As shown in FIG. 3, it is a schematic flowchart of another vehicle control method provided by this embodiment.

As another implementation, on the basis of the foregoing Embodiment I, optionally, the method further includes:

Step 2011: obtaining current environmental feature information around the vehicle.

Step 2012: identifying a risky object based on the current environmental feature information, where the risky object includes a person or an object appearing on a road in front of the vehicle or at a roadside.

Step 2013: controlling the driving state of the vehicle according to the risky object.

Specifically, the vehicle may be provided with a camera (such as a binocular camera, a monocular camera, etc.), a radar, a laser radar, a millimeter wave radar, etc., and the vehicle can obtain the current environmental feature information around the vehicle in real time during actual driving.

Optionally, the related environmental feature information can also be obtained by a roadside V2X sensor. A manner in which the current environmental feature information is obtained is not limited in this embodiment.

The current environmental feature information may include lane line feature information, intersection feature information, lane number feature information, roadside object feature information, and the like.

The lane line feature information may include location information of a lane line, the number of lane lines at different positions of the road ahead, and the like. The intersection feature information may include location information of an intersection, the number of ways at the intersection, buildings in different orientations at the intersection, traffic light information at the intersection, and the like. The lane number feature information may include the number of lanes corresponding to different positions ahead. The roadside object feature information may include respective people or objects appearing beside the road, such as buildings, signs, utility poles, and the like. The environmental feature information may also include other feature information, which may be set according to actual needs and here is only an illustrative description, and limitations are not set herein.

Optionally, the current environmental feature information may be obtained by performing certain processing according to detection information of the sensors, and a specific processing manner may be any applicable manner in the prior art. For example, a location of a lane line, the number of lanes in different road segments, a location of a roadside building, and so on can be obtained through a laser radar and a camera combined with GPS positioning or point cloud visual positioning.

After the current environmental feature information is obtained, the risky object is identified based on the current environmental feature information, and the risky object includes a person or an object appearing on the road in front of the vehicle or at the roadside.

A risky object type can be preset, such as a ball, people, etc. that appear on the road, as well as people, a school, a lawn, bushes, a sidewalk, etc. at the roadside. When a risky object consistent with the preset risky object type is identified based on the current environmental feature information, the driving state of the vehicle is controlled according to the risky object, to improve the driving safety of the vehicle. Different control modes can be set for different types of risky objects. The specific risky object type may be any type that can be identified in an actual situation and that poses a risk to the driving of the vehicle, such as a cliff, a water area, fire, etc., which is not limited in this embodiment.

Illustratively, when it is identified that a ball appears on the road ahead, it is likely that someone will come to pick up the ball, and the risk is relatively high, then the vehicle can be controlled to stop.

Illustratively, when it is identified that there is a child on a sidewalk, the vehicle needs to be controlled to decelerate. If there is a railing between the sidewalk and the road, the vehicle can drive normally and does not need to decelerate and the like.

Illustratively, if it is identified that there is a school at the roadside, it is necessary to decelerate and the like.

Here, the difference from the foregoing control of the vehicle according to the risky road segment is that the vehicle determines whether it is in a risky state and needs to be controlled, according to a scene perceived in real time. It is possible to further compensate for risky situations that occur on road segments in the map that are not preset as risky road segments, to further improve the driving safety of the vehicle.

Optionally, warning information can also be issued after the risky object is identified.

Optionally, controlling the driving state of the vehicle according to the risky object includes:

obtaining a risk level of the risky object according to a preset mapping relationship between a risky object type and the risk level; and controlling the driving state of the vehicle according to the risk level of the risky object.

Specifically, the mapping relationship between the risky object type and the risk level may be preset, and the driving state of the vehicle may be controlled according to the risk level of the risky object.

After the risk level of the risky object is determined, controlling the driving state of the vehicle according to the risk level of the risky object is consistent with controlling the driving state of the vehicle according to the risk level of the risky road segment, and details are not described here again.

As another implementation, on the basis of the foregoing Embodiment I, optionally, the method further includes:

Step 104: generating warning information as an alert if it is determined that the vehicle drives to the risky road segment.

Specifically, when it is determined that the vehicle drives to the risky road segment, warning information may be generated to alert the passengers in the vehicle to pay attention while the vehicle is controlled.

It should be noted that the respective implementations in these embodiments can be implemented separately, or be implemented in any combination without conflicts, which is not limited in the present disclosure.

With the vehicle control method provided in this embodiment, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved. Also, the vehicle can determine whether it is in a risky state and needs to be controlled, according to the scene perceived in real time. It is possible to further compensate for risky situations that occur on road segments in the map that are not preset as risky road segments, to further improve the driving safety of the vehicle.

Embodiment III

This embodiment provides a vehicle control apparatus for performing the method of the first embodiment described above.

Figure 4:
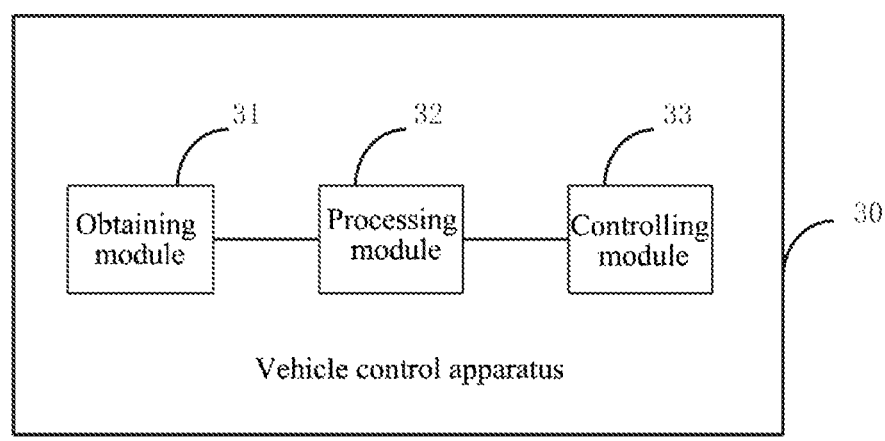
FIG. 4 is a schematic structural diagram of a vehicle control apparatus according to an embodiment of the present disclosure.

FIG. 4 is a schematic structural diagram of a vehicle control apparatus provided in this embodiment. The vehicle control apparatus 30 includes an obtaining module 31, a processing module 32, and a controlling module 33.

The obtaining module 31 is configured to obtain current driving information of a vehicle; the processing module 32 is configured to determine, according to the current driving information and a preset risk map, whether the vehicle drives to a risky road segment, where the preset risk map includes risky road segments of roads; the controlling module 33 is configured to control a driving state of the vehicle accordingly if it is determined that the vehicle drives to a risky road segment.

With regard to the apparatus in this embodiment, the specific manner in which the respective modules perform operations has been described in detail in the embodiments relating to the method, and will not be described in detail here.

According to the vehicle control apparatus provided by this embodiment, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved.

Embodiment IV

This embodiment further supplements the description of the apparatus provided in the Embodiment III as described above.

As an implementation, on the basis of the foregoing Embodiment III, optionally, the current driving information includes current location information; and the processing module is specifically configured to:

determine that the vehicle drives to the risky road segment if it is determined that a distance between the current location information and a location area of the risky road segment in the preset risk map is less than a preset distance threshold.

As another implementation, on the basis of the foregoing Embodiment III, optionally, the controlling module is specifically configured to:

obtain a risk level corresponding to a first risky road segment if it is determined that the vehicle drives to the first risky road segment; and control the driving state of the vehicle according to the risk level corresponding to the first risky road segment.

Optionally, the preset risk map further includes risky areas corresponding to the risky road segments, where the risky areas include roadside risky areas and road risky areas; and the controlling module is specifically configured to:

obtain a type of a risky area corresponding to the first risky road segment if it is determined that the vehicle drives to the first risky road segment; and determine the risk level corresponding to the first risky road segment according to the type of the risky area corresponding to the first risky road segment.

Optionally, the current driving information further includes a current driving speed, and different risk levels correspond to different driving speeds; and the controlling module is specifically configured to:

determine whether the current driving speed is greater than a driving speed corresponding to the risk level corresponding to the first risky road segment; and control the vehicle to decelerate if it is determined that the current driving speed is greater than the driving speed corresponding to the risk level corresponding to the first risky road segment.

In another implementation, on the basis of the foregoing Embodiment III, optionally, the obtaining module is further configured to obtain current environmental feature information around the vehicle;

the processing module is further configured to identify a risky object based on the current environmental feature information, where the risky object includes a person or an object appearing on the road in front of the vehicle or at the roadside; and the controlling module is further configured to control the driving state of the vehicle according to the risky object.

Optionally, the controlling module is specifically configured to:

obtain a risk level of the risky object according to a preset mapping relationship between a risky object type and the risk level; and control the driving state of the vehicle according to the risk level of the risky object.

As another implementation, on the basis of the foregoing Embodiment III, optionally, the controlling module is further configured to:

generate warning information as an alert if it is determined that the vehicle drives to the risky road segment.

With regard to the apparatus in this embodiment, the specific manner in which the respective modules perform operations has been described in detail in the embodiments relating to the method, and will not be described in detail here.

It should be noted that the respective implementations in this embodiment can be implemented separately, or be implemented in any combination without conflicts, which is not limited in the present disclosure.

According to the vehicle control apparatus in this embodiment, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved. Also, the vehicle can determine whether it is in a risky state and needs to be controlled, according to the scene perceived in real time. It is possible to further compensate for risky situations that occur on road segments in the map that are not preset as risky road segments, to further improve the driving safety of the vehicle.

Embodiment V

This embodiment provides a computer device for performing the vehicle control method provided by the foregoing embodiments.

Figure 5:
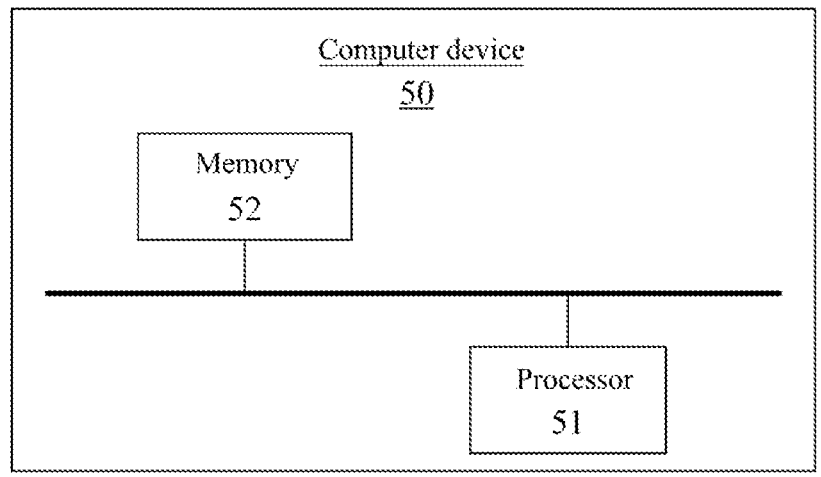
FIG. 5 is a schematic structural diagram of a computer device according to an embodiment of the present disclosure.

FIG. 5 is a schematic structural diagram of the computer device provided by this embodiment. The computer device 50 includes: at least one processor 51 and a memory 52;

the memory stores a computer program; and the at least one processor executes the computer program stored in the memory to implement the method provided by the above embodiments.

According to the computer device in this embodiment, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved. Also, the vehicle can determine whether it is in a risky state and needs to be controlled, according to the scene perceived in real time. It is possible to further compensate for risky situations that occur on road segments in the map that are not preset as risky road segments, to further improve the driving safety of the vehicle.

Embodiment VI

This embodiment provides a vehicle for performing the method provided by the above embodiments.

Figure 6:
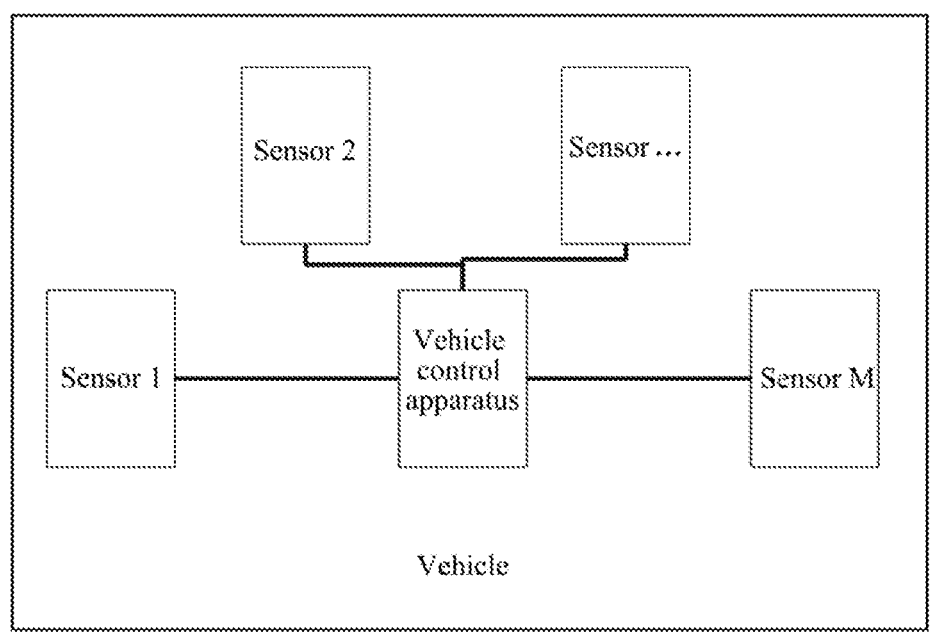
FIG. 6 is a schematic structural diagram of a vehicle according to an embodiment of the present disclosure.

FIG. 6 is a schematic structural diagram of the vehicle provided in this embodiment. The vehicle includes: at least one sensor, and the apparatus provided by any of the above embodiments. Here M is a positive integer. The sensor can be a sensor of different types, such as a camera, a binocular camera, a monocular camera, a radar, a laser radar, a millimeter wave radar, and the like.

According to the vehicle in this embodiment, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved. Also, the vehicle can determine whether it is in a risky state and needs to be controlled, according to the scene perceived in real time. It is possible to further compensate for risky situations that occur on road segments in the map that are not preset as risky road segments, to further improve the driving safety of the vehicle.

Embodiment VII

This embodiment provides a computer readable storage medium, where the computer readable storage medium stores a computer program, which, when executed, implements the method provided by any of the foregoing embodiments.

According to the computer readable storage medium in this embodiment, by presetting a risk map, defining road and roadside risky areas in the map, defining risky road segments of roads according to the road and roadside risky areas, determining in real time, whether the vehicle drives to a risky road segment during the driving of the vehicle, and controlling a driving state of the vehicle when it is determined that the vehicle drives to the risky road segment, to decelerate or stop the vehicle, etc., so as to avoid risks that the risky areas cause to the driving of the vehicle, the driving safety of the vehicle can be effectively improved. Also, the vehicle can determine whether it is in a risky state and needs to be controlled, according to the scene perceived in real time. It is possible to further compensate for risky situations that occur on road segments in the map that are not preset as risky road segments, to further improve the driving safety of the vehicle.

In the embodiments provided by the present disclosure, it should be understood that the disclosed apparatus and method may be implemented in other manners. For example, the apparatus embodiments described above are merely illustrative. For example, the division of units is only a logical function division, and in actual implementations, there may be other division manners, for example, multiple units or components may be combined or integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purposes of the solutions of the embodiments.

In addition, each functional unit in each embodiment of the present disclosure may be integrated into one processing unit, or each unit may exist physically separately, or two or more units may be integrated into one unit. The above integrated unit can be implemented in the form of hardware or in the form of hardware plus a software functional unit.

The above-described integrated unit implemented in the form of a software functional unit can be stored in a computer readable storage medium. The software functional unit described above is stored in a storage medium and includes instructions for causing a computer device (which may be a personal computer, a server, or a network device, etc.) or a processor to perform part of the steps of the methods described in various embodiments of the present disclosure. The foregoing storage medium includes: a U disk, a mobile hard disk, a read-only memory (ROM), a random access memory (RAM), a magnetic disk, or an optical disk, and the like, which can store program codes.

A person skilled in the art can clearly understand that for the convenience and brevity of the description, the division of respective functional modules described above is only taken as an example for illustration. In practical applications, the above functions can be assigned to different functional modules to be completed as needed, that is, the internal structure of an apparatus is divided into different functional modules to perform all or part of the functions described above. For the specific working process of the apparatus described above, reference can be made to the corresponding process in the foregoing method embodiments, and details are not described here again.

Finally, it should be noted that the above embodiments are only used to describe the technical solutions of the present disclosure, and shall not be construed as limitations. Although the present disclosure has been described in considerable detail with reference to the foregoing embodiments, it should be understood by persons of ordinary skill in the art that, modifications or equivalent substitutions of part or all of the features can still be made to the technical solutions of the foregoing embodiments, and such modifications or substitutions do not cause the essence of the resultant technical solution to deviate from the scope of the technical solutions of the embodiments according to the present disclosure.

What is claimed is:

1. A vehicle control method, comprising:
   obtaining current driving information of a vehicle;
   determining, according to the current driving information and a preset risk map, whether the vehicle drives to a risky road segment, wherein the preset risk map comprises risky road segments of roads; and
   controlling a driving state of the vehicle accordingly when it is determined that the vehicle drives to the risky road segment,
   wherein controlling the driving state of the vehicle accordingly when it is determined that the vehicle drives to the risky road segment, comprises:
   obtaining a risk level corresponding to a first risky road segment when it is determined that the vehicle drives to the first risky road segment; and
   controlling the driving state of the vehicle according to the risk level corresponding to the first risky road segment, wherein:
   the preset risk map further comprises a roadside risky area corresponding to the first risky road segment, and
   the controlling of the driving state of the vehicle according to the risk level corresponding to the first risky road segment, comprises:
   detecting roadside object feature information which comprises feature information of a roadside object;
   determining the risk level corresponding to the first risky road segment based on the roadside object feature information and the roadside risky area; and
   controlling the driving state of the vehicle according to the risk level corresponding to the first risky road segment based on the roadside object feature information,
   wherein the roadside object feature information comprises an object appearing beside the first risky road segment, wherein the object comprises a guardrail between the vehicle and the roadside risky area.

2. The method according to claim 1, wherein the current driving information comprises current location information; and
   the determining, according to the current driving information and the preset risk map, whether the vehicle drives to the risky road segment, comprises:
   determining that the vehicle drives to the risky road segment when it is determined that a distance between the current location information and a location area of the risky road segment in the preset risk map is less than a preset distance threshold.

3. The method according to claim 1, wherein the preset risk map further comprises risky areas corresponding to the risky road segments, wherein the risky areas comprise roadside risky areas and road risky areas; and
   obtaining the risk level corresponding to the first risky road segment when it is determined that the vehicle drives to the first risky road segment, comprises:
   obtaining a type of a risky area corresponding to the first risky road segment when it is determined that the vehicle drives to the first risky road segment; and
   determining the risk level corresponding to the first risky road segment according to the type of the risky area corresponding to the first risky road segment.

4. The method according to claim 1, wherein the current driving information further comprises a current driving speed, and different risk levels correspond to different driving speeds; and
   the controlling of the driving state of the vehicle according to the risk level corresponding to the first risky road segment comprises:
   determining whether the current driving speed is greater than a driving speed corresponding to the risk level corresponding to the first risk road segment; and
   controlling the vehicle to decelerate when it is determined that the current driving speed is greater than the driving speed corresponding to the risk level corresponding to the first risk road segment.

5. The method according to claim 1, wherein the method further comprises:
   obtaining current environmental feature information around the vehicle;
   identifying a risky object based on the current environmental feature information, wherein the risky object comprises a person or an object appearing on a road in front of the vehicle or at a roadside; and
   controlling the driving state of the vehicle according to the risky object.

6. The method according to claim 5, wherein the controlling of the driving state of the vehicle according to the risky object comprises:
   obtaining a risk level of the risky object according to a preset mapping relationship between a risky object type and the risk level; and
   controlling the driving state of the vehicle according to the risk level of the risky object.

7. The method according to claim 1, wherein the method further comprises:
   generating warning information as an alert when it is determined that the vehicle drives to the risky road segment.

8. The method according to claim 1, further comprising:
   establishing the preset risk map by collecting map data for establishing a navigation map, wherein the map data comprises road data and data outside a road; and
   selectively processing the data outside the road to label the roadside risky area as any one of a school, a lawn, bushes, or a sidewalk.

9. The method according to claim 1, wherein the preset risk map comprises independent map data or a risk layer defined over a navigation map.

10. The method according to claim 1, wherein the preset risk map comprises a region of interest (ROI) layer, wherein the ROI layer comprises semantic information about roadside risk reference information and road risk reference information for automatic driving of the vehicle.

11. The method according to claim 1, wherein the risky road segment of a road is defined according to the road and the roadside risky area.

12. A vehicle control apparatus, comprising: at least one processor, and a memory for storing a computer program which, when executed by the at least one processor, causes the at least one processor to:
obtain current driving information of a vehicle;
determine, according to the current driving information and a preset risk map, whether the vehicle drives to a risky road segment, wherein the preset risk map comprises risky road segments of roads; and
control a driving state of the vehicle accordingly when it is determined that the vehicle drives to the risky road segment,
wherein the computer program further causes the at least one processor to:
obtain a risk level corresponding to a first risky road segment when it is determined that the vehicle drives to the first risky road segment, wherein the preset risk map further comprises a roadside risky area corresponding to the first risky road segment;
detect roadside object feature information which comprises feature information of a roadside object;
determine the risk level corresponding to the first risky road segment based on the roadside object feature information and the roadside risky area; and
control the driving state of the vehicle according to the risk level corresponding to the first risky road segment based on the roadside object feature information,
wherein the roadside object feature information comprises an object appearing beside the first risky road segment, wherein the object comprises a guardrail between the vehicle and the roadside risky area.

13. The apparatus according to claim 12, wherein the current driving information comprises current location information; and
the computer program further causes the at least one processor to:
determine that the vehicle drives to the risky road segment when it is determined that a distance between the current location information and a location area of the risky road segment in the preset risk map is less than a preset distance threshold.

14. The apparatus according to claim 12, wherein the preset risk map further comprises risky areas corresponding to the risky road segments, wherein the risky areas comprises roadside risky areas and road risky areas; and
the computer program further causes the at least one processor to:
obtain a type of a risky area corresponding to the first risky road segment when it is determined that the vehicle drives to the first risky road segment; and
determine the risk level corresponding to the first risky road segment according to the type of the risky area corresponding to the first risky road segment.

15. The apparatus according to claim 12, wherein the current driving information further comprises a current driving speed, and different risk levels correspond to different driving speeds; and
the computer program further causes the at least one processor to:
determine whether the current driving speed is greater than a driving speed corresponding to the risk level corresponding to the first risk road segment; and
control the vehicle to decelerate when it is determined that the current driving speed is greater than the driving speed corresponding to the risk level corresponding to the first risk road segment.

16. The apparatus according to claim 12, wherein the computer program further causes the at least one processor to:
obtain current environmental feature information around the vehicle;
identify a risky object based on the current environmental feature information, wherein the risky object comprises a person or an object appearing on a road in front of the vehicle or at a roadside; and
control the driving state of the vehicle according to the risky object.

17. The apparatus according to claim 16, wherein the computer program further causes the at least one processor to:
obtain a risk level of the risky object according to a preset mapping relationship between a risky object type and the risk level; and
control the driving state of the vehicle according to the risk level of the risky object.

18. The apparatus according to claim 12, wherein the computer program further causes the at least one processor to:
generate warning information as an alert when it is determined that the vehicle drives to the risky road segment.

19. A non-transitory computer readable storage medium, wherein the computer readable storage medium stores a computer program, which, when executed, implements a vehicle control method, comprising:
obtaining current driving information of a vehicle;
determining, according to the current driving information and a preset risk map, whether the vehicle drives to a risky road segment, wherein the preset risk map comprises risky road segments of roads; and
controlling a driving state of the vehicle accordingly when it is determined that the vehicle drives to the risky road segment,
wherein controlling the driving state of the vehicle accordingly when it is determined that the vehicle drives to the risky road segment, comprises:
obtaining a risk level corresponding to a first risky road segment when it is determined that the vehicle drives to the first risky road segment; and
controlling the driving state of the vehicle according to the risk level corresponding to the first risky road segment, wherein:
the preset risk map further comprises a roadside risky area corresponding to the first risky road segment, and
the controlling of the driving state of the vehicle according to the risk level corresponding to the first risky road segment, comprises:
detecting roadside object feature information which comprises feature information of a roadside object;
determining the risk level corresponding to the first risky road segment based on the roadside object feature information and the roadside risky area; and
controlling the driving state of the vehicle according to the risk level corresponding to the first risky road segment based on the roadside object feature information, wherein the roadside object feature information comprises an object appearing beside the first risky road segment, wherein the object comprises a guardrail between the vehicle and the roadside risky area.

\* \* \* \* \*